(12) United States Patent
Kawamoto et al.

(10) Patent No.: US 9,870,385 B2
(45) Date of Patent: Jan. 16, 2018

(54) COMPUTER SYSTEM, DATA MANAGEMENT METHOD, AND COMPUTER

(71) Applicant: Hitachi, Ltd., Tokyo (JP)

(72) Inventors: Shinichi Kawamoto, Tokyo (JP); Miyuki Hanaoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 324 days.

(21) Appl. No.: 14/428,805

(22) PCT Filed: Apr. 1, 2013

(86) PCT No.: PCT/JP2013/059840
§ 371 (c)(1),
(2) Date: Mar. 17, 2015

(87) PCT Pub. No.: WO2014/162397
PCT Pub. Date: Oct. 9, 2014

(65) Prior Publication Data
US 2015/0234882 A1 Aug. 20, 2015

(51) Int. Cl.
*G06F 17/30* (2006.01)
(52) U.S. Cl.
CPC .. *G06F 17/30353* (2013.01); *G06F 17/30117* (2013.01); *G06F 17/30171* (2013.01); *G06F 17/30864* (2013.01); *G06F 2201/805* (2013.01)
(58) Field of Classification Search
CPC ......... G06F 17/30867; G06F 17/30011; G06F 17/274

(Continued)

(56) References Cited

U.S. PATENT DOCUMENTS 5,511,188 A * 4/1996 Pascucci ................. G06F 9/465
6,092,189 A * 7/2000 Fisher ...................... G06F 8/71
713/1

(Continued)

FOREIGN PATENT DOCUMENTS

EP 2856356 A2 * 4/2015
JP 7-56740 A 3/1995

(Continued)

OTHER PUBLICATIONS

International Search Report and Written Opinion.

(Continued)

*Primary Examiner* — Polina Peach
*Assistant Examiner* — Ahmed Abraham
(74) *Attorney, Agent, or Firm* — Mattingly & Malur, PC

(57) ABSTRACT

A computer system comprising a plurality of computers and a storage system, further comprising: a first data processing module configured to process data transmitted from an apparatus; a memory store; a database; a memory store control module; a second data processing module configured to execute predetermined processing using processed data included in a first data range; and a third data processing module configured to execute predetermined processing using the processed data included in a second data range, the memory store control module being configured to: specify a third data range, which is a time range of the processed data to be written to the database; and specify deletable processed data based on the first data range and the third data range.

6 Claims, 10 Drawing Sheets

(58) Field of Classification Search
USPC .......................................................... 707/634
See application file for complete search history.

(56) References Cited

U.S. PATENT DOCUMENTS

| | | | | |
|---|---|---|---|---|
| 7,706,883 | B1* | 4/2010 | Singh | A61N 1/37252 |
| | | | | 607/27 |
| 7,949,643 | B2* | 5/2011 | Kawale | G06F 17/30867 |
| | | | | 707/706 |
| 8,122,016 | B1* | 2/2012 | Lamba | G06F 17/30976 |
| | | | | 707/723 |
| 8,650,185 | B1* | 2/2014 | Spevacek | G06Q 10/1053 |
| | | | | 707/705 |
| 8,700,619 | B2* | 4/2014 | Wiegering | G06F 17/30864 |
| | | | | 707/728 |
| 2004/0024954 | A1* | 2/2004 | Rust | G06F 3/0607 |
| | | | | 711/100 |
| 2005/0071328 | A1* | 3/2005 | Lawrence | G06F 17/30867 |
| 2006/0010300 | A1* | 1/2006 | Arakawa | G06F 11/2074 |
| | | | | 711/162 |
| 2008/0097966 | A1* | 4/2008 | Choi | G06F 17/3087 |
| 2010/0250526 | A1* | 9/2010 | Prochazka | G06F 17/30672 |
| | | | | 707/723 |
| 2012/0166180 | A1* | 6/2012 | Au | G06F 17/274 |
| | | | | 704/9 |
| 2013/0011123 | A1* | 1/2013 | Jia | H04N 5/4448 |
| | | | | 386/278 |
| 2014/0164352 | A1* | 6/2014 | Denninghoff | H03H 9/02622 |
| | | | | 707/711 |
| 2015/0100569 | A1* | 4/2015 | Reis De Sousa | G06F 17/2235 |
| | | | | 707/723 |
| 2015/0220612 | A1* | 8/2015 | Wada | G06F 11/2094 |
| | | | | 707/623 |

FOREIGN PATENT DOCUMENTS

| | | |
|---|---|---|
| JP | 2000-331423 A | 11/2000 |
| WO | 2012/073526 A1 | 6/2012 |

OTHER PUBLICATIONS

Koji Kida, "Data-Stream Processing Platform for Analyzing Huge-Scale Continuous Sensor Data in Real-Time", The Transactions of the Institute of Electronics, Information and Communication Engineers, Nov. 1, 2012, vol. J95-B, No. 11, pp. 1396-1403.

* cited by examiner

- DESIGNATION OF TIME ZONE : $\begin{cases} \text{OFFSET FROM APPOINTED TIME:Z\_offset = 0 MINUTES} \\ \text{INTERVAL:Z\_interval = 1 HOUR} \end{cases}$

*Fig. 5A*

- WRITE TIMING : OFFSET FROM APPOINTED TIME:U_offset = 10 MINUTES
- WRITE TARGET TIME ZONE : $n$ TIME ZONES BEFORE NEWEST TIME ZONE ; n=2

*Fig. 5B*

(COMMAND A):OBTAINING OF EVENT DATA:DESIGNATIONOF ORDER OF EVENT OCCURRENCE
get_event_nth(k,0)

(COMMAND B):OBTAINING OF EVENT DATA:DESIGNATION OF TIME OR TIME RANGE
get_event_at(k,17:31-17:42)

(COMMAND C):OBTAINING OF STATE DATA:DESIGNATION OF TIME OR TIME RANGE
get_state_at(k,-1)

*Fig. 6*

DATA MANAGEMENT INFORMATION /330

STORAGE DATA MANAGEMENT INFORMATION

700

| PROCESSING TYPE /701 | TIME ZONE /702 | | |
|---|---|---|---|
| | TZ0 | TZ1 | TZ2 |
| WRITE PROCESSING | UNPROCESSED | UNPROCESSED | UNPROCESSED |
| STATE MONITORING PROCESSING | IN USE | IN USE | IN USE |

WRITE DATA RANGE MANAGEMENT INFORMATION

710

| | TIME ZONE /711 | TZ_head /712 | TZ_tail /713 |
|---|---|---|---|
| WRITE DATA RANGE | TZ0 | 9/20 12:59:18 | 9/20 12:00:23 |
| | TZ1 | 9/20 13:01:05 | 9/20 13:58:56 |
| | TZ2 | 9:20 14:01:02 | 9/20 14:08:43 |

PROCESSING DATA RANGE MANAGEMENT INFORMATION

720

| | R_head /721 | R_tail /722 |
|---|---|---|
| PROCESSING DATA RANGE | 9/20 14:08:43 | 9/20 12:10:51 |

*Fig. 7*

COMPUTER SYSTEM, DATA MANAGEMENT METHOD, AND COMPUTER

BACKGROUND OF THE INVENTION

This invention relates to a computer system, data management method and computer for processing big data.

Currently, systems for processing large amounts of various types of data, namely, "big data", are becoming more widespread. In such systems, processing such as obtaining required data from real time data transmitted from a terminal and the like is executed. Such processing is herein referred to as real time data processing.

Further, in such a system, the processing results of the real time data are stored in a database, and past data is analyzed based on those processing results. Such processing is herein referred to as history analysis processing.

Hitherto, because the database storing the processing results is formed of a plurality of disk apparatus, writing the data to the database is slow. Therefore, the processing performance of real time data processing deteriorates due to the delays in the writing of the data. As a result, there has been a problem in that the real time data processing cannot be carried out securely in real time.

As a technology for solving the above-mentioned problem, an in-memory database configured to store all data in a memory enabling quick access is known. However, in a case where all data is stored in a memory, there is a problem in that equipment costs increase due to a large number of memories being required.

Thus, as a system configured to ensure the processing performance of real time data processing and suppress equipment costs, technologies disclosed in JP 2000-331423 A and JP 07-56740 A are known, for example.

In JP 2000-331423 A, it is disclosed that in order to securely record data such as moving images on a disk recording medium in real time, "data from a moving image input unit 4 is accumulated in temporary storage means, and when the fact that a predetermined amount of the data has been accumulated is detected by data accumulated amount detecting means, disk recording/playback processing means records data on the disk recording medium without being controlled by an external system control unit 6."

In JP 07-56740 A, it is disclosed that in order to inform a user of the results of analyzing, diagnosing, and inferring data representing a state of a monitoring target continuously for a long period without harming the real time nature of the processing, "input data is chronologically stored in an element buffer of a shared memory configured to store the input data as history data. When the stored input data exceeds the upper limit of the storage capacity of the element buffer, a representative value for the element buffer is determined by a noise removing apparatus in conjunction with noise removing processing for removing data uncertainty. Newer representative values are stored in a separate element buffer in a higher level."

SUMMARY OF THE INVENTION

In addition to the real time data processing and the analysis processing, a system needs to perform processing using data included in a range that extends back a short period from the current data. Such processing is herein referred to as state monitoring processing.

In the state monitoring processing, access to the data stored in the database is required. Further, the state monitoring processing is executed more frequently than the history analysis processing. This means that the access load on the database increases, which has an effect on the processing performance of the history analysis processing. Further, in the state monitoring processing, because access to the database is required, there is also a problem in that fast processing cannot be realized.

This invention has been made in view of the above-mentioned problems. In other words, it is an object of this invention to provide a system, a method and an apparatus, which are optimized to perform real time event processing, state monitoring processing, and history analysis processing.

The present invention can be appreciated by the description which follows in conjunction with the following figures, wherein: a computer system configured to process data transmitted from an external apparatus, the computer system comprising a plurality of computers and a storage system, each of the plurality of computers including a processor, a memory coupled to the processor, and a network interface coupled to the processor, the storage system including a controller and at least one storage medium. The data transmitted from the external apparatus includes a time stamp. The computer system further comprises: a first data processing module configured to process the data transmitted from the external apparatus; a memory store constructed on a storage area of the memory included in at least one of the plurality of computers, the memory store being configured to temporarily store processed data processed by the first data processing module; a database constructed on a storage area of the at least one storage medium included in the storage system, the database being configured to store the processed data; a memory store control module configured to manage the processed data stored in the memory store and to control read processing and write processing to and from the memory store; a database management module configured to manage the database and to control read processing and write processing to and from the database; a second data processing module configured to execute predetermined processing using the processed data included in a first data range of the processed data stored in the memory store; and a third data processing module configured to execute predetermined processing using the processed data included in a second data range of the processed data stored in the database, the second data range having a larger data range than the first data range. The memory store control module is configured to: specify a third data range, which is a time range of the processed data to be written to the database; obtain the processed data included in the specified third data range from the memory store; transmit to the database management module a write request to write the obtained processed data to the database; and specify deletable processed data of the processed data temporarily stored in the memory store based on the first data range and the third data range.

According to one embodiment of this invention, the processing performance of the processing executed by the first data processing module, the processing executed by the second data processing module, and the processing executed by the third data processing module can be optimized, and the capacity of the memory store can be ensured.

BRIEF DESCRIPTION OF THE DRAWINGS

The present invention can be appreciated by the description which follows in conjunction with the following figures, wherein:

FIGS. 5A and 5B are each explanatory diagrams showing an example of parameters to be set for a memory store control module according to the first embodiment of this invention, FIG. 6 is an explanatory diagram showing an example of commands issued via an access interface according to the first embodiment of this invention, FIG. 7 is an explanatory diagram showing an example of information included in data management information according to the first embodiment of this invention.

DETAILED DESCRIPTION OF THE PREFERRED EMBODIMENTS

Embodiments of this invention are described below with reference to the accompanying drawings.

First Embodiment

Figure 1:
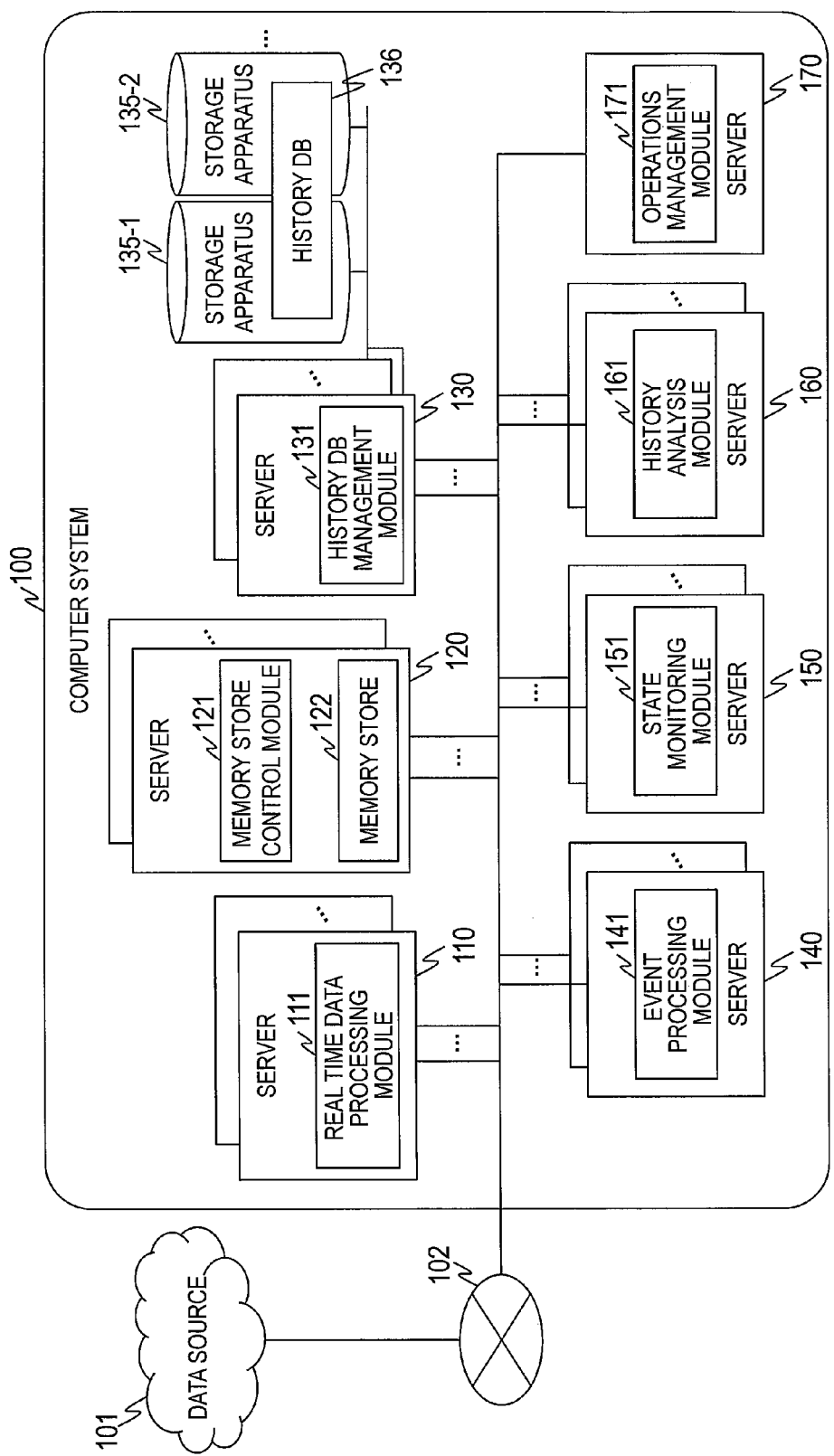
FIG. 1 is a block diagram illustrating a configuration of a computer system according to a first embodiment of this invention.

FIG. 1 is a block diagram illustrating a configuration of a computer system according to a first embodiment of this invention.

A computer system 100 according to the first embodiment includes a plurality of servers. The computer system 100 is coupled to a data source 101 via a network 102.

The data source 101 includes a terminal configured to transmit data to be processed by the computer system, a wireless base station, a network apparatus, and the like. In this invention, the type of data to be transmitted from the data source 101 is not limited.

The computer system 100 includes a server 110, a server 120, a server 130, a server 140, a server 150, a server 160, and a server 170.

The server 110 is a computer that a real time data processing module 111 runs on. The real time data processing module 111 is configured to execute predetermined processing using data that is currently being transmitted from the data source 101, namely, real time data. Further, the real time data processing module 111 is configured to transmit a processing result to the server 120 and the server 140.

For example, the real time data processing module 111 executes stream data processing for integrating or classifying data transmitted from the data source 101 based on a predetermined query. It should be noted that in this invention, the processing executed by the real time data processing module 111 is not limited.

The server 140 is a computer that an event processing module 141 runs on. The event processing module 141 is configured to execute real time event processing. Specifically, the event processing module 141 detects a predetermined event based on data transmitted from the real time data processing module 111, and executes processing corresponding to the detected event.

For example, the event processing module 141 delivers an advertising message to a terminal and the like based on position data. It should be noted that in this invention, the processing executed by the event processing module 141 is not limited.

The server 120 is a computer that a memory store control module 121 runs on. The memory store control module 121 is configured to manage a memory store 122 constructed on a memory included in each of a plurality of servers 120.

The memory store 122 is a database constructed on one storage area formed by virtually integrating the memory included in each of the plurality of servers 120. In this embodiment, data transmitted from the real time data processing module 111 is temporarily stored in the memory store 122.

Based on processing that is described below, the memory store control module 121 writes the data stored in the memory store 122 to a history DB 136, or deletes the data stored in the memory store 122.

The server 150 is a computer that a state monitoring module 151 runs on. The state monitoring module 151 is configured to execute state analysis processing using the data stored in the memory store 122.

For example, the state monitoring module 151 executes state monitoring processing for generating a heat map representing the population density of various regions over a predetermined period. It should be noted that in this invention, the processing executed by the state monitoring module 151 is not limited.

The server 130 is a computer that a history DB management module 131 runs on. A plurality of storage apparatus 135 are coupled to the server 130. In this embodiment, the history DB 136 is constructed on a storage area of the plurality of storage apparatus 135. Examples of the storage apparatus 135 include a hard disk drive (HDD), a solid state drive (SSD), and the like.

It should be noted that a storage system including a plurality of storage apparatus 135 may be used instead of the storage apparatus 135. The storage system includes a controller (not shown) including a processor (not shown) and a memory (not shown), a disk interface (not shown), and the plurality of storage apparatus 135.

The history DB management module 131 is configured to store the data transmitted from the real time data processing module 111 in the history DB 136. Further, the history DB management module 131 is configured to read predetermined data from the history DB 136 based on a request from another server, and transmit the read data to that another server.

The server 160 is a computer that a history analysis module 161 runs on. The history analysis module 161 is configured to obtain data from the history DB 136, and execute history analysis processing using the obtained data.

For example, the history analysis module 161 executes history analysis processing for calculating a population distribution of various regions over a 1 week period. It should be noted that in this invention, the processing executed by the history analysis module 161 is not limited.

The server 170 is a computer that an operations management module 171 runs on. The operations management module 171 is configured to manage the whole computer system 100. For example, the operations management module 171 manages the arrangement and configuration of the servers, and monitors the load on the servers and the like.

It should be noted that the computer system 100 may also include a client terminal and the like operated by an administrator.

In this invention, as described above, the state monitoring module 151 executes state monitoring processing by accessing the memory store 122, and the history analysis module 161 executes history analysis processing by accessing the history DB 136. Consequently, an increase in the access load on the history DB 136 can be suppressed, and the processing performance of the state monitoring module 151 can be improved.

Figure 2:
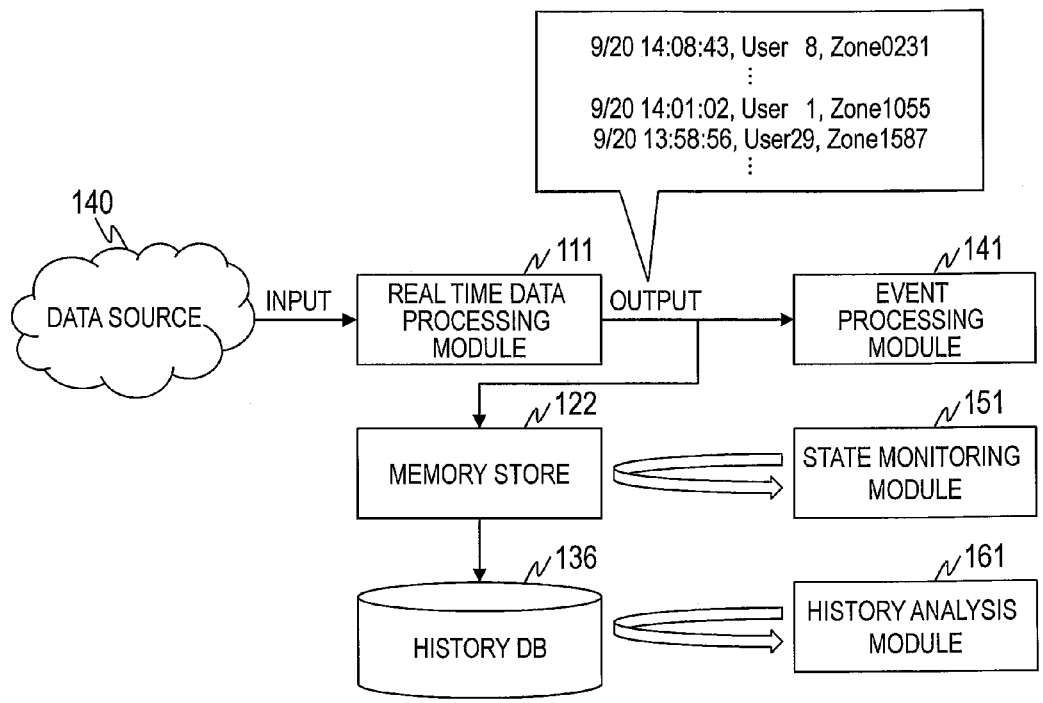
FIG. 2 is an explanatory diagram illustrating a flow of processing by the computer system according to the first embodiment of this invention.

FIG. 2 is an explanatory diagram illustrating a flow of processing by the computer system 100 according to the first embodiment of this invention.

The real time data processing module 111 processes data input from the data source 101 based on a predetermined query. The real time data processing module 111 transmits the processing result to the event processing module 141 and the memory store 122.

The memory store control module 121 stores the data received from the real time data processing module 111 in the memory store 122. When a predetermined timing is reached, the real time data processing module 111 writes the data stored in the memory store 122 to the history DB 136. Further, in a case where a predetermined condition is satisfied, the memory store control module 121 deletes the data stored in the memory store 122.

The event processing module 141 executes processing using the real time data. The state monitoring module 151 executes processing using the data included in a time range extending back a fixed period from the current time. The history analysis module 161 executes processing using past data of a predetermined time range. For example, the state monitoring module 151 executes predetermined processing using the data included in a time period extending back 2 hours from the current time, and the history analysis module 161 executes predetermined processing using the data included in a time range from 0:00 to 15:00.

Because the ranges of the data processed by the event processing module 141, the state monitoring module 151, and the history analysis module 161 are different, the timing of writing the data to the history DB 136 from the memory store 122 and the timing of deleting the data from the memory store 122 need to be adjusted.

For example, when the memory store control module 121 deletes data stored in the memory store 122 immediately after having written that data to the history DB 136, the state monitoring module 151 needs to read the data from the history DB 136, which causes processing performance to deteriorate.

In addition, if the volume of data stored in the memory store 122 is equal to or more than a threshold value, when the predetermined data is written to the history DB 136, the same problem as described above occurs.

Further, when the memory store control module 121 is sequentially writing data that has finished being processed by the state monitoring module 151 to the history DB 136, the server 120 and the server 130 are frequently communicating to and from each other, which can result in the deterioration of the processing performance of the overall computer system 100. In addition, increasing the capacity of the memory store 122 causes a problem in that costs also increase.

Therefore, the timing of writing the data to the history DB 136 from the memory store 122 and the timing of deleting the data from the memory store 122 need to be optimized.

Figure 3:
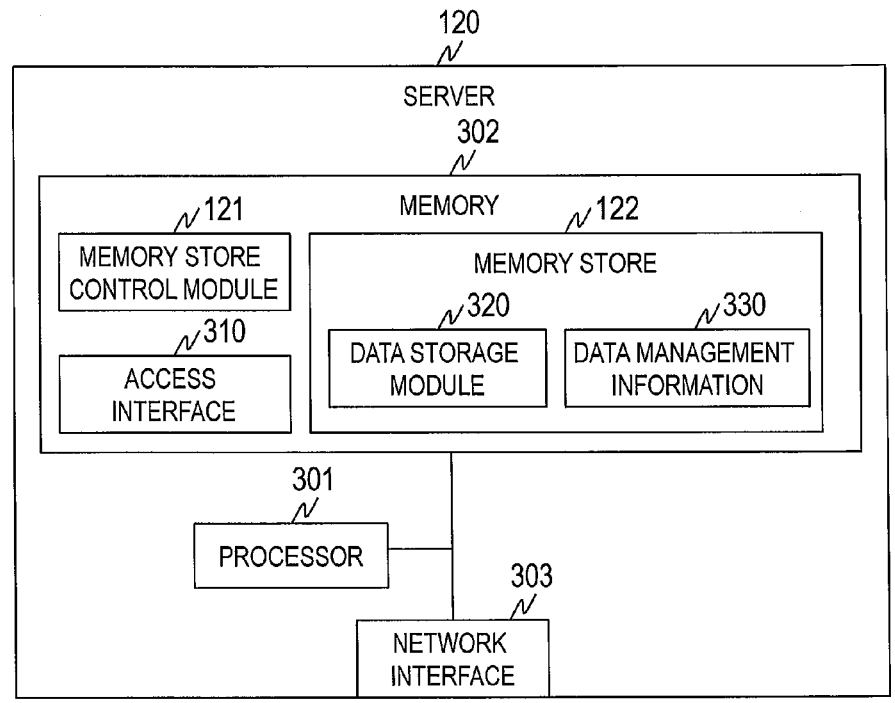
FIG. 3 is a block diagram illustrating an example of a configuration of a server according to the first embodiment of this invention.

FIG. 3 is a block diagram illustrating an example of a configuration of a server according to the first embodiment of this invention. The configuration of the server 120 is described with reference to FIG. 3.

The server 120 includes a processor 301, a memory 302, and a network interface 303.

The processor 301 is configured to execute programs stored in the memory 302. The processor 301 can realize the functions of the server 120 by executing those programs. In the following description, when the description is given with a focus on a program, it means that the program is being executed by the processor 301.

The memory 302 stores the programs to be executed by the processor 301 and the data required to execute those programs. Further, the memory 302 of the server 120 includes a storage area for forming the memory store 122.

It should be noted that, for ease of description, the memory store 122 is described as being constructed on the memory 302 of one server 120.

The memory 302 stores programs for realizing the memory store control module 121 and an access interface 310.

The access interface 310 provides an interface that allows another server to access the memory store 122. The memory store control module 121 is configured to monitor access requests (commands) received by the access interface 310.

Further, the memory 302 includes the memory store 122. The memory store 122 includes a data storage module 320 and data management information 330.

The data storage module 320 is configured to store data transmitted from the real time data processing module 111. The data management information 330 is information for managing, among data stored in the data storage module 320, the range of the data required for the processing to be executed by the state monitoring module 151 and the range of the data to be written to the history analysis module 161.

It should be noted that the hardware configuration of the server 110, the server 140, the server 150, the server 160, and the server 170 is the same as the hardware configuration of the server 120. Further, the server 130 includes, in addition to the processor 301, the memory 302, and the network interface 303, a disk interface for coupling to the storage apparatus 135.

Further, a program for realizing the real time data processing module 111 is stored in the memory of the server 110, and a program for realizing the history DB management module 131 is stored in the memory of the server 130. A program for realizing the event processing module 141 is stored in the memory of the server 140, a program for realizing the state monitoring module 151 is stored in the memory of the server 150, a program for realizing the history analysis module 161 is stored in the memory of the server 160, and a program for realizing the operations management module 171 is stored in the memory of the server 170.

Figure 4:
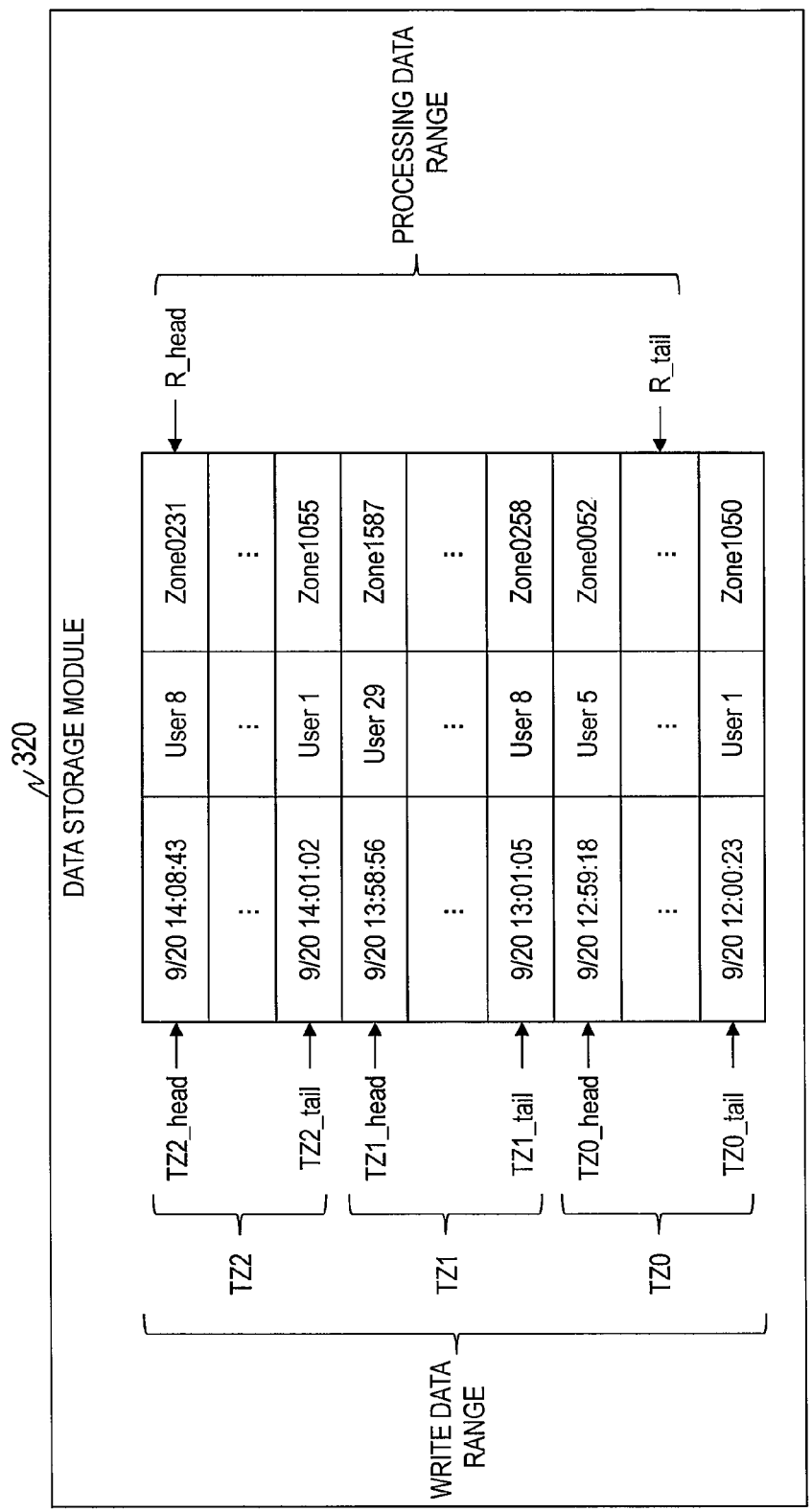
FIG. 4 is an explanatory diagram showing an example of data stored in data storage module according to the first embodiment of this invention.

FIG. 4 is an explanatory diagram showing an example of the data stored in the data storage module 320 according to the first embodiment of this invention. FIGS. 5A and 5B are each explanatory diagrams showing an example of parameters to be set for the memory store control module 121 according to the first embodiment of this invention. FIG. 6 is an explanatory diagram showing an example of the commands issued via the access interface 310 according to the first embodiment of this invention.

The data storage module 320 stores a plurality of pieces of data (records) including a time stamp and various attribute columns. In the example shown in FIG. 4, the data (one of a record) include a time stamp, a user ID, and position information.

In this embodiment, the memory store control module 121 manages the range of the data to be written to the history DB 136 as a write data range, and the range of the data to be processed by the state monitoring module 151 as a processing data range.

The write data range includes a plurality of time zones. A time zone is a time range set in advance. For example, 1 hour from 0:00 to 1:00 may be set as a time zone.

In this embodiment, each time zone is set so as not to overlap with another time zone. Further, each time zone is set so that a starting point (TZ_tail) of one time zone is continuous from a finishing point (TZ_head) of an adjacent time zone. Further, in this embodiment, the data is written to the history DB 136 in time zone units.

In the memory store control module 121, a parameter including the starting point of the time zone and the time range of the time zone is set as information for managing the time zone.

For example, a parameter such as that shown in FIG. 5A is set. By setting the parameter shown in FIG. 5A, the memory store control module 121 manages the range of the designated time stamp as a time zone.

In the following description, the parameter for managing a time zone is also referred to as a first parameter.

In the example shown in FIG. 4, the range having the time stamp from "9/20 12:00:00" to "9/20 12:59:59" is managed as a time zone TZ0, the range having the time stamp from "9/20 13:00:00" to "9/20 13:59:59" is managed as a time zone TZ1, and the range having the time stamp from "9/20 14:00:00" to "9/20 14:59:59" is managed as a time zone TZ2.

Further, in the memory store control module 121, a parameter including the timing of write processing and the time zone of the write target is set as information required for writing data to the history DB 136.

For example, a parameter such as that shown in FIG. 5B is set. By setting the parameter shown in FIG. 5B, the data included in the time zone that is two time zones before the newest time zone is written to the history DB 136 at 10 past the hour.

In the following description, the parameter necessary for the write processing is also referred to as a second parameter.

The processing data range is a time range designated by the state monitoring module 151. More specifically, the processing data range is designated using commands such as those shown in FIG. 6. It should be noted that those commands are issued by the state monitoring module 151 to the access interface 310.

One command is a command for obtaining a predetermined number of pieces of event data in order from the event data with the newest time stamp. Command A shown in FIG. 6 is a command for obtaining k pieces of event data with the newest time stamp.

One command is a command for obtaining event data for a predetermined time or a predetermined time range. Command B shown in FIG. 6 is a command for obtaining k pieces of event data from 17:35 to 17:42. It should be noted that the time that is used may be any one of a relative time and an absolute time.

One command is a command for obtaining state data for a predetermined time or a predetermined time range. Command C shown in FIG. 6 is a command for obtaining k pieces of state data of the state one minute before the current time.

It should be noted that the above-mentioned commands are examples, and this invention is not limited to those commands. In this embodiment, a command is issued for obtaining data for the previous one hour period based on the data of the newest time stamp as a starting point.

FIG. 7 is an explanatory diagram showing an example of information included in the data management information 330 according to the first embodiment of this invention.

The data management information 330 includes storage data management information 700, write data range management information 710, and processing data range management information 720.

The storage data management information 700 stores information for managing the data stored in the memory store 122. Specifically, the storage data management information 700 includes a processing type 701 and a time zone 702.

The processing type 701 stores an identification name of the processing. In this invention, there are two entries, namely, write processing and state monitoring processing. The write processing indicates write processing of data from the memory store 122 to the history DB 136. The state monitoring processing indicates the processing to be executed by the state monitoring module 151.

The time zone 702 stores information indicating a processing state of the data included in the time zone.

In the time zone column of the write processing entry, information is stored indicating whether or not write processing of the data included in that time zone is complete. Specifically, in a case where write processing of the data included in the time zone is complete, "processed" is stored in that time zone column, and in a case where write processing of the data included in the time zone is not complete, "unprocessed" is stored in that time zone column.

In the time zone column of the state monitoring processing entry, information is stored indicating whether or not the data included in that time zone is being used by state monitoring processing. Specifically, in a case where the data included in that time zone is being used by state monitoring processing, "in use" is stored in the time zone column including that data, and in a case where none of the data included in the time zone is being used by state monitoring processing, "not in use" is stored in that time zone column.

It should be noted that instead of using the above-mentioned information, a flag indicating that the write processing is complete, and a flag indicating that state monitoring processing is using the data may be employed.

The write data range management information 710 stores information for managing the write data range. Specifically, the write data range management information 710 includes a time zone 711, a TZ_head 712 and a TZ_tail 713.

The time zone 711 stores an identification name of the time zone. The TZ_head 712 stores the newest time stamp of the time stamps of the data included in the time zone. The TZ_tail 713 stores the oldest time stamp of the time stamps of the data included in the time zone.

The processing data range management information 720 stores information for specifying the processing data range. The processing data range management information 720 includes an R_head 721 and an R_tail 722.

The R_head 721 stores a time stamp of the data that is a starting point of the processing data range. The R_tail 722 stores a time stamp of the data that is a finishing point of the processing data range.

Figure 8:
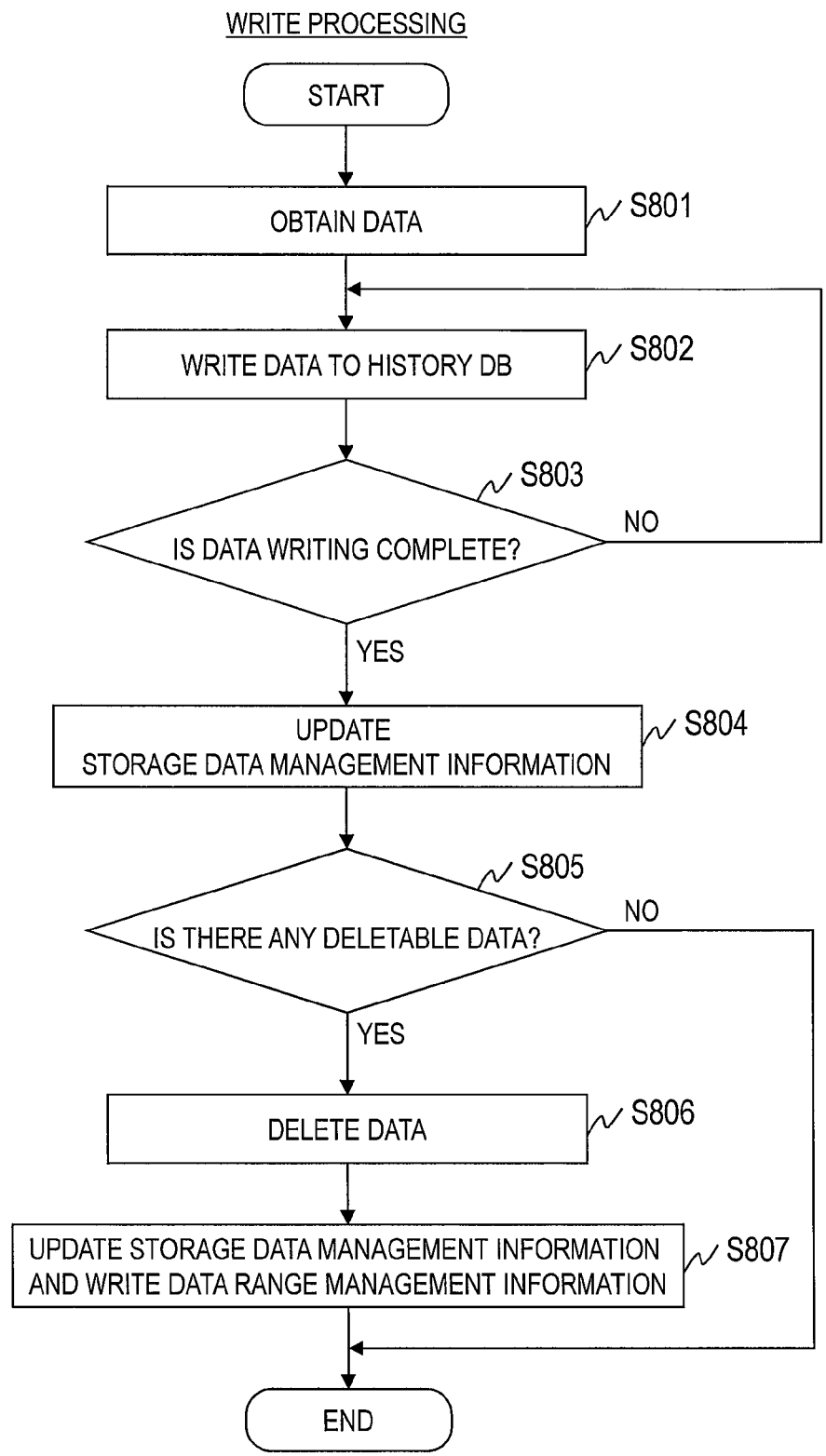
FIG. 8 is a flowchart illustrating an example of write processing executed by the memory store control module according to the first embodiment of this invention.

FIG. 8 is a flowchart illustrating an example of write processing executed by the memory store control module 121 according to the first embodiment of this invention.

In the memory store control module 121, when a predetermined write timing is reached, the write processing described below is started in order to write, of the data stored in the memory store 122, the data included in the target time zone to the history DB 136.

The first parameter such as that shown in FIG. 5A is input in advance to the server 120 that the memory store control module 121 runs on. Consequently, information for managing the time zone is set. Further, the second parameter such as that shown in FIG. 5B is input in advance to the server 120 that the memory store control module 121 runs on. Consequently, the write timing and the target time zone are set. In this case, the memory store control module 121 starts write processing at 10 past the hour, and determines that the time zone that is two time zones before the newest time zone is the target time zone.

In a case where the processing starts, the memory store control module 121 obtains from the memory store 122 the data to be written to the history DB 136 (Step S801). Specifically, the memory store control module 121 executes processing such as the following.

The memory store control module 121 refers to the write data range management information 710 based on the value of the target time zone included in the second parameter, and retrieves the entry corresponding to the target time zone.

The memory store control module 121 obtains the TZ_head 712 and the TZ_tail 713 of the entry corresponding to the target time zone, and obtains from the data storage module 320 the data included in the time range from the TZ_head 712 to the TZ_tail 713.

In the example shown in FIG. 7, the memory store control module 121 retrieves the entry of the time zone TZ0 that is two time zones before the newest time zone TZ2, and obtains the data included in the time zone TZ0 from the data storage module 320.

The above-mentioned processing is the processing performed in Step S801.

Next, the memory store control module 121 writes the obtained data to the history DB 136 (Step S802).

Specifically, the memory store control module 121 transmits a write request including the obtained data to the history DB management module 131 of the server 130. It should be noted that if the size of the data obtained from the memory store 122 is large, the memory store control module 121 may transmit the obtained data by dividing the data into a plurality of portions.

It should be noted that the history DB management module 131 writes the data included in the write request to the history DB 136 in a case where the write request is received.

Then, the memory store control module 121 determines whether or not the writing of the data to the history DB 136 is complete (Step S803).

For example, the memory store control module 121 determines whether or not a message notifying that the writing of the data to the history DB 136 is complete has been received from the history DB management module 131.

In a case where it is determined that the writing of the data to the history DB 136 is not complete, the memory store control module 121 returns to Step S802, and executes the same processing.

In a case where it is determined that the writing of the data to the history DB 136 is complete, the memory store control module 121 updates the storage data management information 700 (Step S804).

Specifically, the memory store control module 121 stores "processed" in the column corresponding to the target time zone of the write processing entry. In this embodiment, "processed" is stored in the time zone TZ0 column.

Then, the memory store control module 121 determines whether or not there is any deletable data (Step S805).

Specifically, the memory store control module 121 refers to the storage data management information 700, and retrieves a time zone in which "processed" is stored in the time zone column of the write processing entry, and "not in use" is stored in the time zone column of the state monitoring processing entry. In other words, a time zone is retrieved in which all of the data included in the time zone is written to the history DB 136, and none of the data included in the time zone is being used by the state monitoring module 151.

In a case where there is a time zone satisfying the above-mentioned conditions, the memory store control module 121 determines that there is deletable data. In the following description, a time zone satisfying the above-mentioned conditions is also referred to as a deletion target time zone.

In a case where it is determined that there is no deletable data, the memory store control module 121 finishes the processing.

In a case where it is determined that there is deletable data, the memory store control module 121 deletes the data included in the deletion target time zone from the data storage module 320 (Step S806).

In addition, the memory store control module 121 updates the storage data management information 700 and the write data range management information 710 (Step S807), and then finishes the processing. Specifically, the memory store control module 121 executes processing such as that described below.

The memory store control module 121 deletes the deletion target time zone column from the time zone 702 of the storage data management information 700. At this stage, the memory store control module 121 may also update the identification name of another time zone.

Further, the memory store control module 121 deletes the entry of the deletion target time zone from the write data range management information 710. At this stage, the memory store control module 121 may also update the identification name of another time zone.

For example, in a case where the data included in the time zone TZ0 has been deleted from the data storage module 320, the memory store control module 121 deletes the time zone TZ0 column from the storage data management information 700, and deletes the time zone TZ0 entry from the write data range management information 710. At this stage, the memory store control module 121 updates the identification name of the time zone TZ1 to TZ0, and the identification name of the time zone TZ2 to TZ1.

Figure 9A:
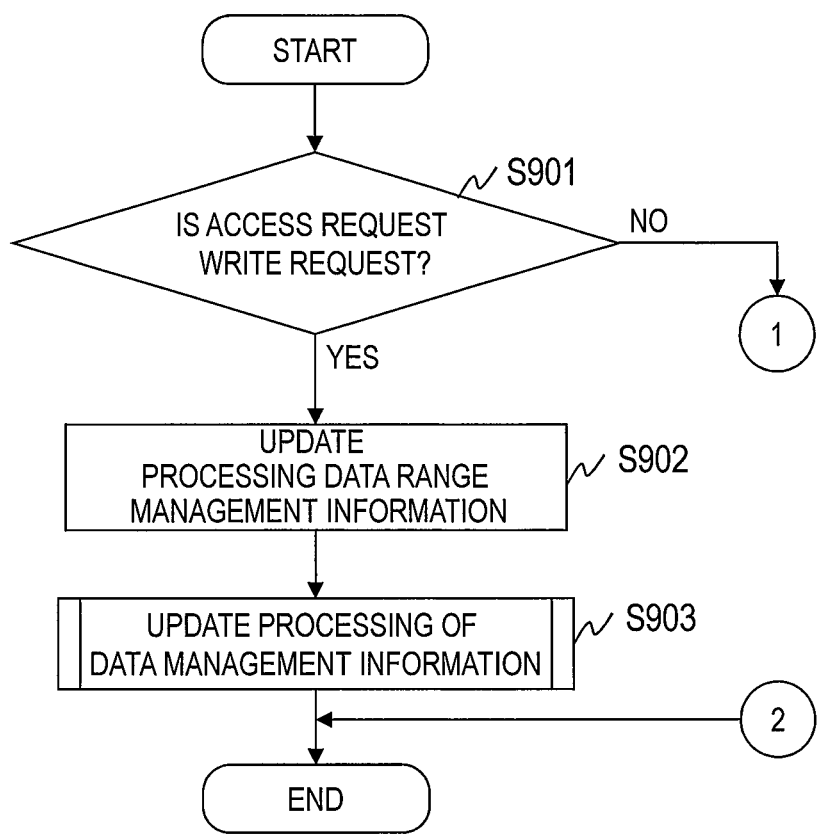
FIGS. 9A and 9B are flowcharts illustrating an example of access processing executed by the memory store control module according to the first embodiment of this invention.
Figure 9B:
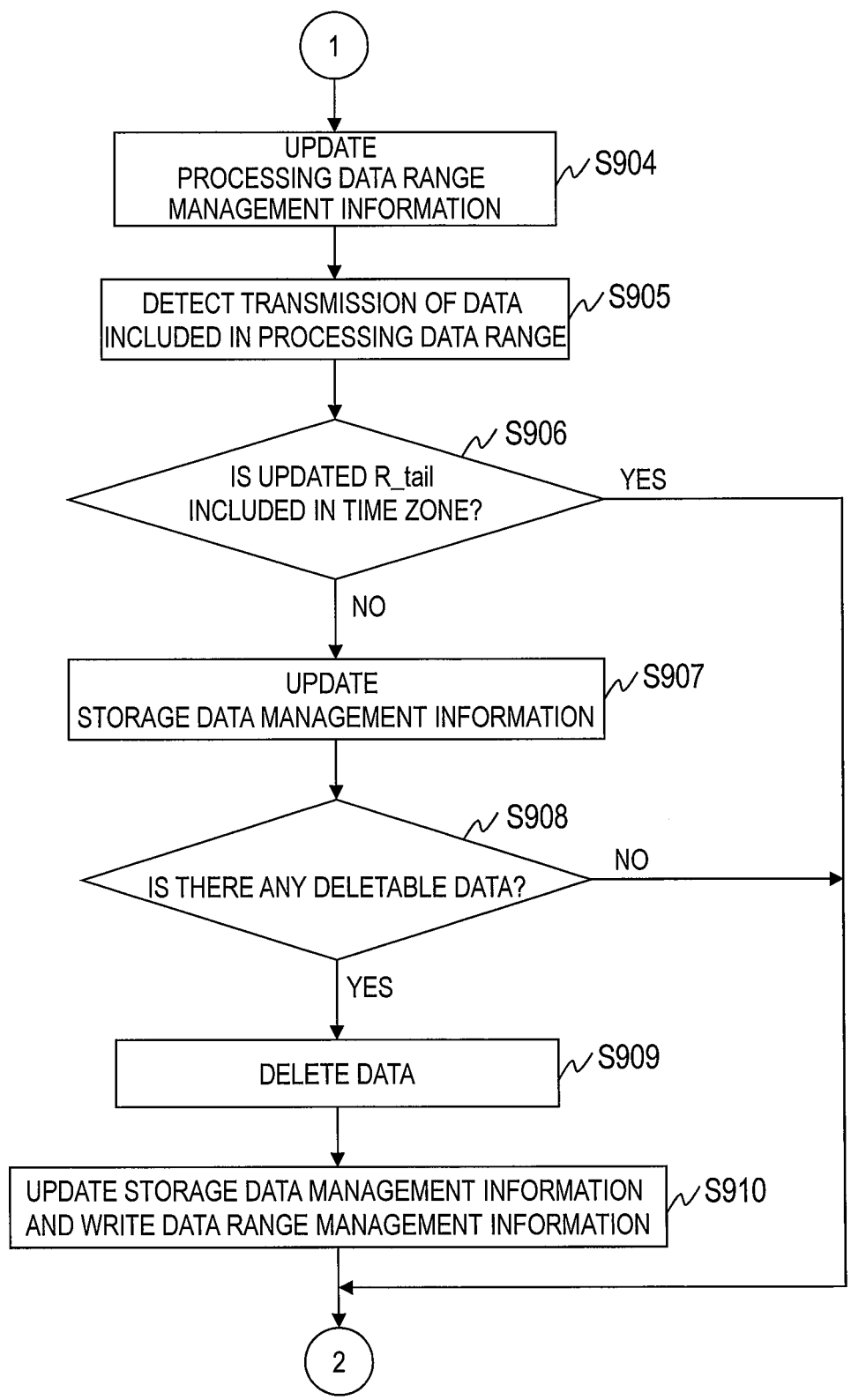

FIGS. 9A and 9B are flowcharts illustrating an example of access processing executed by the memory store control module 121 according to the first embodiment of this invention.

The memory store control module 121 starts the access processing that is described below in a case where the access interface 310 receives an access request. It should be noted that the first parameter such as that shown in FIG. 5A is input in advance to the server 120 that the memory store control module 121 runs on.

The memory store control module 121 determines whether or not the access request is a request transmitted from the real time data processing module 111 to write data to the memory store 122 (Step S901).

Specifically, the memory store control module 121 can perform this determination by analyzing a command corresponding to an access request.

In this embodiment, in a case where the access request is a write request, the memory store control module 121 determines that the received request is a request transmitted from the real time data processing module 111 to write data to the memory store 122. This is because only the real time data processing module 111 writes data to the memory store 122.

Further, in this embodiment, in a case where the access request is a command corresponding to a read request, the memory store control module 121 determines that the received request is a request transmitted from the state monitoring module 151 to read data from the memory store 122. This is because only the state monitoring module 151 reads data from the memory store 122.

In a case where it is determined that the access request is a request to write data to the memory store 122, the memory store control module 121 updates the processing data range management information 720 (Step S902).

Specifically, the memory store control module 121 stores the time stamp of the data included in the write request in the R_head 721. At this stage, the R_tail 722 is not updated. It should be noted that in a case where a plurality of pieces of data are included in the write request, the newest time stamp among the time stamps of those plurality of pieces of data is stored in the R_head 721.

The memory store control module 121 executes update processing of the data management information 330 (Step S903), and then finishes the processing. The update processing of the data management information 330 is described below with reference to FIG. 10.

In a case where it is determined in Step S901 that the access request is a request to read data from the memory store 122, the memory store control module 121 updates the processing data range management information 720 (Step S904). Specifically, the memory store control module 121 executes processing such as the following.

The memory store control module 121 specifies the time stamp to be the finishing point of the processing data range based on the R_head 721 of the processing data range management information 720 and information designating the read target data. It should be noted that the information designating the read target data is included in the read request.

For example, for a read request requesting reading of the data included in a time range extending back 1 hour from the R_head 721, the memory store control module 121 refers to the data storage module 320, and of the time stamps included in the time range extending back 1 hour from the R_head 721, specifies the oldest time stamp.

The memory store control module 121 stores the specified time stamp in the R_tail 722. Consequently, the processing data range is confirmed. It should be noted that the memory store control module 121 temporarily holds the value of the pre-update R_tail 722.

The above-mentioned processing is the processing performed in Step S904.

Next, the memory store control module 121 detects transmission of the data included in the processing data range that has passed through the access interface 310 (Step S905). Based on the processing of Step S905, the memory store control module 121 can confirm that the data required for the processing has been transmitted to the state monitoring module 151.

The memory store control module 121 determines whether or not the time zone including the pre-update R_tail 722 and the time zone including the updated R_tail 722 are the same (Step S906). Specifically, the memory store control module 121 executes processing such as the following.

The memory store control module 121 refers to the storage data management information 700, and obtains the identification name of the oldest time zone among the time zones in which the time zone column of the state monitoring processing entry is indicated as "in use". This time zone is a time zone including a pre-update R_tail. In the following description, a time zone including a pre-update R_tail is also referred to as a comparison target time zone.

The memory store control module 121 refers to the write data range management information 710 based on the obtained identification name of the comparison target time zone, and obtains the information of the entry corresponding to the comparison target time zone.

The memory store control module 121 calculates the time range of the comparison target time zone based on the obtained information about the comparison target time zone and the first parameter such as that shown in FIG. 5A.

For example, in a case where the comparison target time zone is the time zone TZ1, because the first parameter such as that shown in FIG. 5A is set in this embodiment, the memory store control module 121 specifies that the time range of the time zone TZ1 is from "13:00:00" to "13:59:59".

The memory store control module 121 determines whether or not the updated R_tail 722 is included in the comparison target time zone based on the calculated time range. In a case where it is determined that the updated R_tail 722 is included in the comparison target time zone, the memory store control module 121 determines that the time zone including the pre-update R_tail 722 and the time zone including the updated R_tail 722 are the same.

The above-mentioned processing is the processing performed in Step S906.

In a case where it is determined that the time zone including the pre-update R_tail 722 and the time zone including the updated R_tail 722 are the same, the memory store control module 121 finishes the processing.

In a case where it is determined that the time zone including the pre-update R_tail 722 and the time zone including the updated R_tail 722 are not the same, the memory store control module 121 updates the storage data management information 700 (Step S907).

Specifically, the memory store control module 121 stores "not in use" in the comparison target time zone column of the state monitoring processing entry.

Then, the memory store control module 121 determines whether or not there is any deletable data (Step S908). The processing performed in Step S908 is the same as the processing performed in Step S805.

In a case where it is determined that there is no deletable data, the memory store control module 121 finishes the processing.

In a case where it is determined that there is deletable data, the memory store control module 121 deletes the data included in the time zone that is retrieved in Step S908 from the data storage module 320 (Step S909).

The memory store control module 121 updates the storage data management information 700 and the write data range management information 710 (Step S910), and then finishes the processing. The processing performed in Step S910 is the same as the processing performed in Step S807.

Figure 10:
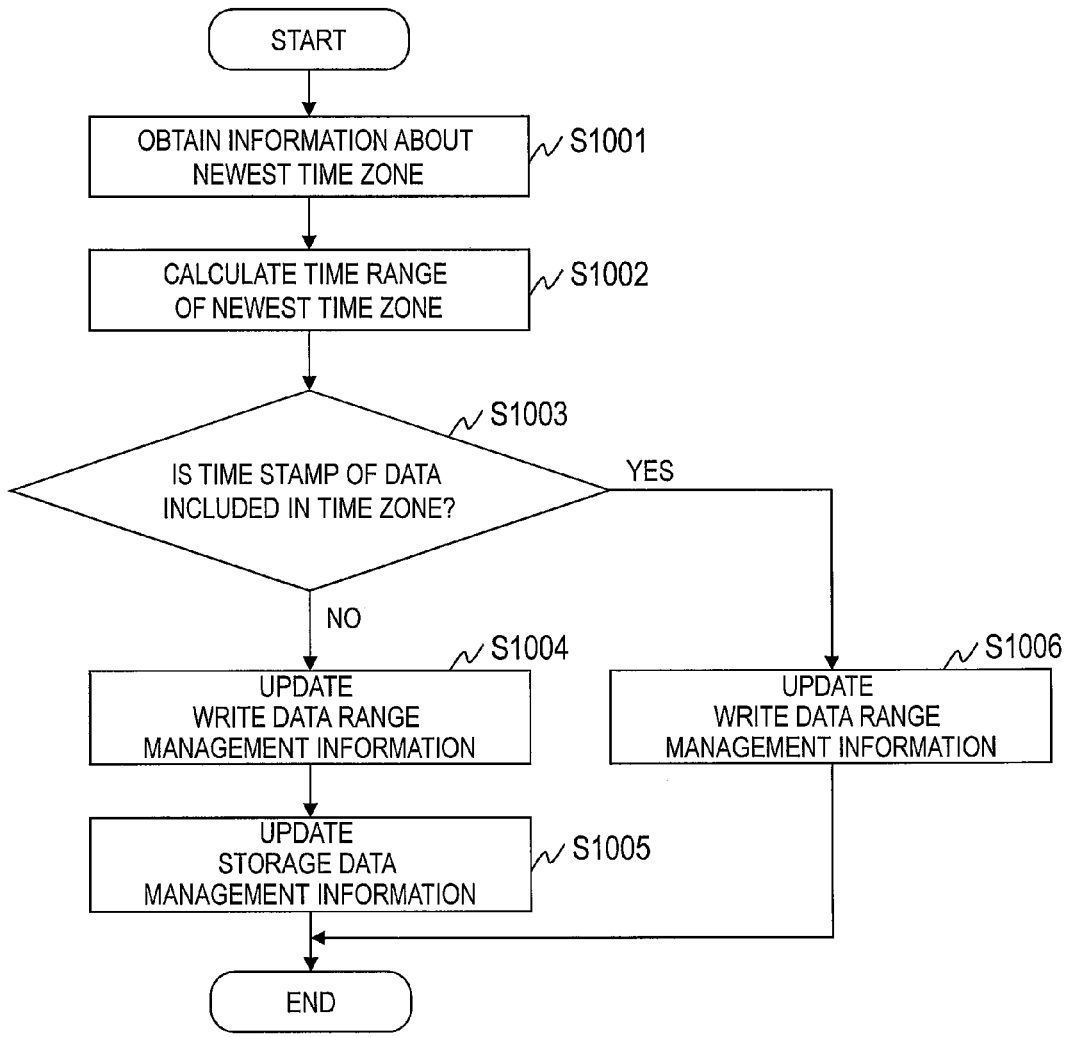
FIG. 10 is a flowchart illustrating an example of update processing of the data management information executed by the memory store control module according to the first embodiment of this invention.

FIG. 10 is a flowchart illustrating an example of update processing of the data management information 330 executed by the memory store control module 121 according to the first embodiment of this invention.

The memory store control module 121 refers to the write data range management information 710, and obtains information about the newest time zone (Step S1001).

Specifically, the memory store control module 121 retrieves the entry having the newest TZ_head 712 of the write data range management information 710, and obtains the information about that entry.

The memory store control module 121 calculates the time range of the newest time zone based on the obtained information about the newest time zone and the first parameter (Step S1002).

In the example shown in FIG. 7, in a case where the newest time zone is the time zone TZ2, because the first parameter such as that shown in FIG. 5A is set in this embodiment, the memory store control module 121 calculates that the time range of the time zone T2 is from "14:00:00" to "14:59:59".

The memory store control module 121 determines whether or not the time stamp of the data included in the write request is included in the retrieved newest time zone based on the calculated time range (Step S1003).

In a case where it is determined that the time stamp of the data included in the write request is not included in the retrieved newest time zone, the memory store control module 121 updates the write data range management information 710 (Step S1004).

Specifically, the memory store control module 121 adds a new time zone entry to the write data range management information 710. Further, the memory store control module 121 stores an identification name of the added time zone in the time zone 711 of the added entry, and stores the time stamp of the data included in the write request in the TZ_tail 713. It should be noted that the TZ_head 712 of the added entry is left blank.

The memory store control module 121 updates the storage data management information 700 (Step S1005), and then finishes the processing.

Specifically, the memory store control module 121 adds a new time zone column to the time zone 702 of the storage data management information 700. In addition, the memory store control module 121 stores "unprocessed" in the added time zone column of the write processing entry, and stores "in use" in the added time zone column of the state monitoring processing entry.

In a case where it is determined in Step S1003 that the time stamp of the data included in the write request is included in the retrieved newest time zone, the memory store control module 121 updates the write data range management information 710 (Step S1006), and then finishes the processing.

Specifically, the memory store control module 121 stores the time stamp of the data included in the write request in the TZ_head 712 of the retrieved newest time zone entry.

As described above, the data transmitted by the real time data processing module 111 is stored in the memory store 122. Consequently, the processing executed by the real time data processing module 111 can be carried out securely in real time.

The state monitoring module 151 executes processing using the data stored in the memory store 122. Hence, the processing performance of the state monitoring processing can be improved, and the access load on the history DB 136 can be suppressed.

In addition, the memory store control module 121 can secure a storage area usable by the memory store by deleting data that has been written to the history DB 136 but is not being used by the state monitoring module 151. Therefore, the need for memory expansion can be suppressed, and an increase in equipment costs of the system can be avoided.

Further, because the data processed by the real time data processing module 111 is temporarily stored in the memory store 122, and then stored in the history HD 136, the data required for history analysis processing can be accumulated.

According to the first embodiment, the system capable of optimally executing three different processes may be realized.

Second Embodiment

A second embodiment of this invention differs from the first embodiment in that a plurality of types of data are stored in the data storage module 320. The differences from the first embodiment are focused on in the following description. Because the configuration of the computer system according to the second embodiment is the same as the configuration in the first embodiment, a description thereof is omitted here.

Figure 11:
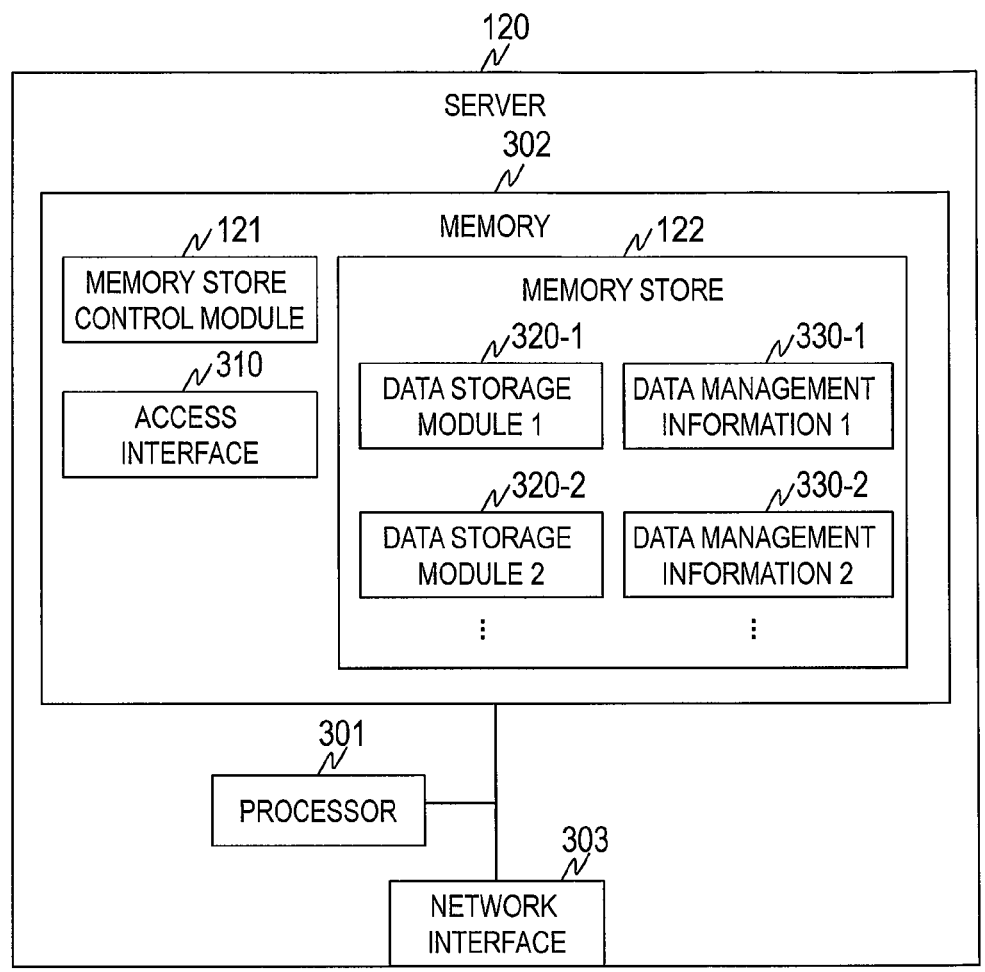
FIG. 11 is a block diagram illustrating a configuration of the server according to the second embodiment of this invention.

FIG. 11 is a block diagram illustrating a configuration of a server according to the second embodiment of this invention. In the second embodiment, the memory store 122 differs from that of the first embodiment in that the memory store 122 includes a data storage module 320 for each type of data. Further, the memory store 122 is different from that of the first embodiment in that the memory store 122 includes data management information 330 such as that shown in FIG. 7 for each type of data.

In the second embodiment, the starting point of the time zone and the time range of the time zone can be set for each type of data. Further, the timing of the write processing and the time zone of the write target can be set for each type of data.

Therefore, in the second embodiment, the write processing illustrated in FIG. 8 is executed for each type of data.

In the access processing according to the second embodiment, the following point is different. In a case where an access request is received, the memory store control module 121 analyzes the access request to specify the type of data of the access target. Then, using the data storage module 320 and the data management information 330 corresponding to the specified data type, the memory store control module 121 executes the processing from Step S901 onward. The rest of the processing is the same as in the first embodiment, and hence a description thereof is omitted here.

In the present embodiment, although an example of using software-based control has been described, part of the control may be realized by hardware.

While the present invention has been described in detail with reference to the accompanying drawings, the present invention is not limited to the specific configuration, and various changes and equivalents can be made within the scope of the claims.

What is claimed is:

1. A computer system configured to process data transmitted from an external apparatus, the computer system comprising a plurality of computers and a storage system,
    each of the plurality of computers including a processor, a memory coupled to the processor, and a network interface coupled to the processor,
    the storage system including a controller and at least one storage medium,
    the data transmitted from the external apparatus including a time stamp,
    the computer system further comprising:
    a first data processing module configured to process the data transmitted from the external apparatus;
    a memory store constructed on a storage area of the memory included in at least one of the plurality of computers, the memory store being configured to temporarily store processed data processed by the first data processing module;
    a database constructed on a storage area of the at least one storage medium included in the storage system, the database being configured to store the processed data;
    a memory store control module configured to manage the processed data stored in the memory store and to control read processing and write processing to and from the memory store;
    a database management module configured to manage the database and to control read processing and write processing to and from the database;
    a second data processing module configured to execute predetermined processing using the processed data included in a first data range of the processed data stored in the memory store; and
    a third data processing module configured to execute predetermined processing using the processed data included in a second data range of the processed data stored in the database, the second data range having a larger data range than the first data range,
    the memory store control module being configured to:
    specify a third data range, which is a time range of the processed data to be written to the database;
    obtain the processed data included in the specified third data range from the memory store;
    transmit to the database management module a write request to write the obtained processed data to the database; and
    specify deletable processed data of the processed data temporarily stored in the memory store based on the first data range and the third data range,
    wherein the first data range is a time range extending a predetermined period back in time from the newest time stamp of the processed data,
    wherein the third data range is a time range advanced by a predetermined period from a time point to be a predetermined reference point,
    wherein the memory store includes, for each of a plurality of the third data ranges, storage data management information for managing a first state indicating a write state of the processed data to the database and a second state indicating a usage state of the processed data by the second data processing module, and
    wherein the memory store control module is configured to:
    refer to the storage data management information; and
    specify, based on the first state and the second state, the deletable processed data of the processed data temporarily stored in the memory store for each of the plurality of the third data ranges,
    wherein the memory store includes third data range management information for managing each of the plurality of the third data ranges, and
    wherein the memory store control module is configured to:
    receive an input of a first parameter for specifying a write timing of the processed data to the database and the third data range to be written;
    refer, after the write timing has passed, to the third data range management information based on the first parameter to specify the third data range to be written from the plurality of the third data ranges;
    obtain the processed data included in the specified third data range from the memory store;
    transmit to the database management module the write request including the obtained processed data;
    update the first state corresponding to the specified third data range to a state indicating that writing of the processed data to the database is complete;
    refer to the storage data management information to retrieve the third data range for which writing of the processed data to the database is complete, and that is not being used by the second data processing module; and
    delete from the memory store the processed data included in the retrieved third data range,
    wherein the memory store includes first data range management information for managing a starting point time stamp, which is a time stamp of the processed data serving as a starting point of the first data range, and a finishing point time stamp, which is a time stamp of the processed data serving as a finishing point of the first data range, and
    wherein the memory store control module is configured to:
    receive an input of a second parameter for designating the predetermined time for specifying the first data range;
    update the starting point time stamp of the first data range management information to the time stamp of the processed data included in the write request to write the processed data of the write request received from the first data processing module;
    specify the oldest time stamp from the processed data included in the time range extending a predetermined period back in time from the starting point time stamp based on the starting point time stamp and the second parameter in a case of being received a read request to read the processed data from the second data processing module;
    update the finishing point time stamp of the first data range management information to the specified oldest time stamp;
    refer to the first data range management information to determine whether the third data range including the processed data corresponding to the pre-update finishing point time stamp and the third data range including the processed data corresponding to the updated finishing point time stamp match;

refer to the storage data management information when there is a determination that the third data range including the processed data corresponding to the pre-update finishing point time stamp and the third data range including the processed data corresponding to the updated finishing point time stamp do not match;

update the second state of the third data range including the processed data corresponding to the pre-update finishing point time stamp to a state indicating that the processed data included in the third data range is not being used;

refer to the storage data management information to retrieve the third data range for which writing of the processed data to the database is complete, and that is not being used by the second data processing module; and delete from the memory store the processed data included in the retrieved third data range.

2. The computer system according to claim 1,
wherein the computer system receives a plurality of types of data from the external apparatus, and
wherein the memory store control module holds the first data range management information, the third data range management information, and the storage data management information for each of the plurality of types of data.

3. A data management method performed in a computer system configured to process data transmitted from an external apparatus, the computer system including a plurality of computers and a storage system,
each of the plurality of computers including a processor, a memory coupled to the processor, and a network interface coupled to the processor,
the storage system including a controller and at least one storage medium,
the data transmitted from the external apparatus including a time stamp,
the computer system further including:
a first data processing module configured to process the data transmitted from the external apparatus;
a memory store constructed on a storage area of the memory included in at least one of the plurality of computers, the memory store being configured to temporarily store processed data processed by the first data processing module;
a database constructed on a storage area of the at least one storage medium included in the storage system, the database being configured to store the processed data;
a memory store control module configured to manage the processed data stored in the memory store and to control read processing and write processing to and from the memory store;
a database management module configured to manage the database and to control read processing and write processing to and from the database;
a second data processing module configured to execute predetermined processing using the processed data included in a first data range of the processed data stored in the memory store; and
a third data processing module configured to execute predetermined processing using the processed data included in a second data range of the processed data stored in the database, the second data range having a larger data range than the first data range,
the data management method including:

a first step of specifying, by the memory store control module, a third data range, which is a time range of the processed data to be written to the database;

a second step of obtaining, by the memory store control module, the processed data included in the specified third data range from the memory store;

a third step of transmitting, by the memory store control module, to the database management module, a write request to write the obtained processed data to the database; and a fourth step of specifying, by the memory store control module, deletable processed data of the processed data temporarily stored in the memory store based on the first data range and the third data range, wherein the first data range is a time range extending a predetermined period back in time from the newest time stamp of the processed data, wherein the third data range is a time range advanced by a predetermined period from a time point to be a predetermined reference point, wherein the memory store including, for each of a plurality of the third data ranges, storage data management information for managing a first state indicating a write state of the processed data to the database and a second state indicating a usage state of the processed data by the second data processing module, and wherein the fourth step includes:
referring to the storage data management information; and
specifying, based on the first state and the second state, the deletable processed data of the processed data temporarily stored in the memory store for each of the plurality of the third data ranges, wherein the memory store includes third data range management information for managing each of the plurality of the third data ranges, and the data management method further includes:
receiving, by the memory store control module, an input of a first parameter for specifying a write timing of the processed data to the database and the third data range to be written:

referring, by the memory store control module, after the write timing has passed, to the third data range management information based on the first parameter to specify the third data range to be written from the plurality of the third data ranges;

obtaining, by the memory store control module, the processed data included in the specified third data range from the memory store;

transmitting, by the memory store control module, to the database management module, the write request including the obtained processed data;

updating, by the memory store control module, the first state corresponding to the specified third data range to a state indicating that writing of the processed data to the database is complete;

referring, by the memory store control module, to the storage data management information to retrieve the third data range for which writing of the processed data to the database is complete, and that is not being used by the second data processing module; and deleting, by the memory store control module, from the memory store, the processed data included in the retrieved third data range, wherein the memory store includes first data range management information for managing a starting point time stamp, which is a time stamp of the processed data serving as a starting point of the first data range, and a finishing point time stamp, which is a time stamp of the processed data serving as a finishing point of the first data range, and the data management method further includes:

receiving, by the memory store control module, an input of a second parameter for designating the predetermined time for specifying the first data range;

updating, by the memory store control module, the starting point time stamp of the first data range management information to the time stamp of the processed data included in the write request to write the processed data of the write request received from the first data processing module;

specifying, by the memory store control module, the oldest time stamp from the processed data included in the time range extending a predetermined period back in time from the starting point time stamp based on the starting point time stamp and the second parameter of a read request to read the processed data from the second data processing module;

updating, by the memory store control module, the finishing point time stamp of the first data range management information to the specified oldest time stamp;

referring, by the memory store control module, to the first data range management information to determine whether or not the third data range including the processed data corresponding to the pre-update finishing point time stamp and the third data range including the processed data corresponding to the updated finishing point time stamp match;

referring, by the memory store control module, to the storage data management information when there is a determination that the third data range including the processed data corresponding to the pre-update finishing point time stamp and the third data range including the processed data corresponding to the updated finishing point time stamp do not match;

updating, by the memory store control module, the second state of the third data range including the processed data corresponding to the pre-update finishing point time stamp to a state indicating that the processed data included in the third data range is not being used;

referring, by the memory store control module, to the storage data management information to retrieve the third data range for which writing of the processed data to the database is complete, and that is not being used by the second data processing module; and deleting, by the memory store control module, from the memory store, the processed data included in the retrieved third data range.

4. The data management method according to claim 3, wherein the computer system receives a plurality of types of data from the external apparatus, and wherein the memory store control module holds the first data range management information, the third data range management information, and the storage data management information for each of the plurality of types of data.

5. A computer, comprising:

a processor;

a memory coupled to the processor;

a network interface coupled to the processor;

a memory store constructed on a storage area of the memory, the memory store being configured to temporarily store data including a time stamp; and a memory store control module configured to manage the data stored in the memory store and to control read processing and write processing to and from the memory store, the memory store control module being configured to:

specify a first data range, which is a time range of data to be written to an external database, from the data stored in the memory store;

obtain the data included in the specified first data range from the memory store;

transmit to another computer configured to manage the database a write request to write the obtained data to the database; and specify deletable data of the data temporarily stored in the memory store based on the first data range and a second data range, which is a time range of data handled by the another computer accessing the memory store, wherein the first data range is a time range advanced by a predetermined period from a time point to be a predetermined reference point, wherein the second data range is a time range extending a predetermined period back in time from the newest time stamp of the data, wherein the memory store includes, for each of a plurality of the first data ranges, storage data management information for managing a first state indicating a write state of the data to the database and a second state indicating a usage state of the data by the another computer accessing the memory store, and wherein the memory store control module is configured to:

refer to the storage data management information, and specify, based on the first state and the second state, the deletable data of the data temporarily stored in the memory store for each of the plurality of the first data ranges, wherein the memory store includes first data range management information for managing each of the plurality of the first data ranges, and wherein the memory store control module is configured to:

receive an input of a first parameter for specifying a write timing of the data to the database and the first data range to be written;

refer, after the write timing has passed, to the first data range management information based on the first parameter to specify the first data range to be written from the plurality of the first data ranges;

obtain the data included in the specified first data range from the memory store;

transmit to the another computer configured to manage the database the write request including the obtained data;

update the first state corresponding to the specified first data range to a state indicating that writing of the data to the database is complete;

refer to the storage data management information to retrieve the first data range for which writing of the data to the database is complete, and that is not being used by the another computer accessing the memory store; and delete from the memory store the data included in the retrieved first data range, wherein the memory store comprises second data range management information for managing a starting point time stamp, which is a time stamp of the data serving as a starting point of the second data range, and a finishing point time stamp, which is a time stamp of the data serving as a finishing point of the first data range, and wherein the memory store control module is configured to:

receive an input of a second parameter for designating the predetermined time for specifying the second data range;

update the starting point time stamp of the second data range management information to the time stamp of the data included in the write request to write the data of the write request;

specify the oldest time stamp from the data included in the time range extending a predetermined period back in time from the starting point time stamp based on the starting point time stamp and the second parameter in a case of being received a read request to read the data stored in the memory store;

update the finishing point time stamp of the second data range management information to the specified oldest time stamp;

refer to the second data range management information to determine whether or not the first data range including the data corresponding to the pre-update finishing point time stamp and the first data range including the data corresponding to the updated finishing point time stamp match;

refer to the storage data management information in a case where it is determined that the first data range including the data corresponding to the pre-update finishing point time stamp and the first data range including the data corresponding to the updated finishing point time stamp do not match;

update the second state of the first data range including the data corresponding to the pre-update finishing point time stamp to a state indicating that the data included in the first data range is not being used;

refer to the storage data management information to retrieve the first data range for which writing of the data to the database is complete, and that is not being used by the another computer accessing the memory store; and delete from the memory store the data included in the retrieved first data range.

6. The computer according to claim 5, wherein the memory store control module holds the first data range management information, the second data range management information, and the storage data management information for each of types of data.

* * * * *